UNITED STATES PATENT OFFICE.

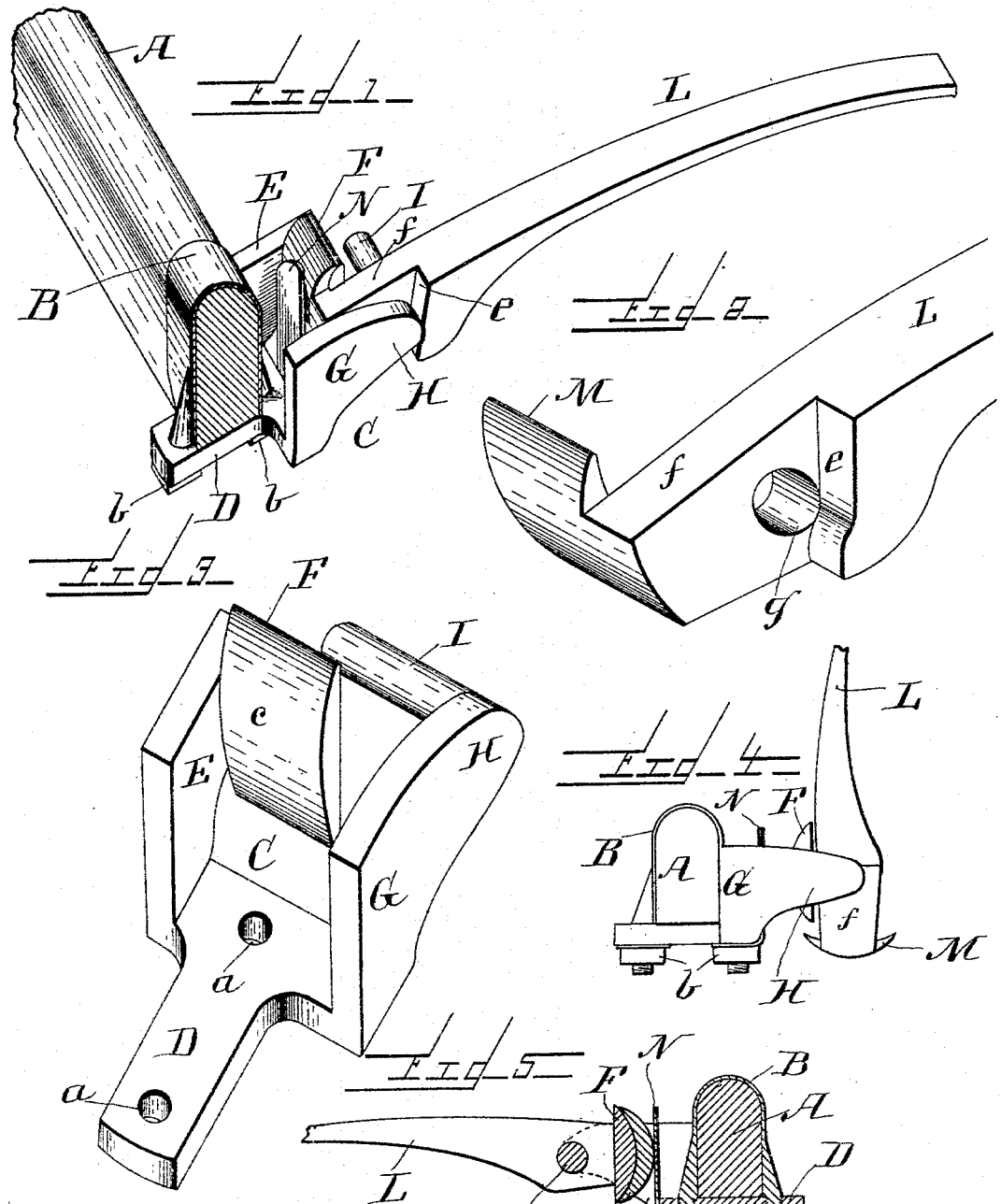

WILLIAM J. POWERS, OF BEDFORD, CANADA, ASSIGNOR OF ONE-HALF TO HIRAM E. BLAKE, OF SAME PLACE.

THILL-COUPLING.

SPECIFICATION forming part of Letters Patent No. 533,742, dated February 5, 1895.

Application filed March 6, 1894. Serial No. 502,573. (No model.)

*To all whom it may concern:*

Be it known that I, WILLIAM J. POWERS, a subject of the Queen of Great Britain, residing at Bedford, county of Missisquoi, in the Province of Quebec and Dominion of Canada, have invented certain new and useful Improvements in Thill-Couplings, of which the following is a specification.

This invention relates to the class of carriages and wagons, and particularly to a thill coupling.

The object of the invention is to provide a thill coupling without bolts and nuts to couple the thill.

A further object of the invention is to provide a thill coupling made only in two parts.

A still further object of the invention is to provide a thill coupling in two parts only; of simple, durable and cheap construction.

The invention consists in the novel construction and arrangement of parts, and essentially in coupling the thill without bolts and nuts.

In the accompanying drawings forming part of this application: Figure 1 is a perspective view of a portion of an axle, with my improved thill coupling attached. Fig. 2 is a perspective view of the thill. Fig. 3 is a bottom perspective view of the thill-jack. Fig. 4 is a side elevation, showing the thill raised upon its pivot for uncoupling, and Fig. 5 is a longitudinal section of the device.

The same letters of reference denote the same parts throughout the several figures of the drawings.

The coupling is attached to the axle A, by the clip B, in the usual manner. The thill-jack C, is one piece, provided at its bottom with an extension plate D, having holes a, through which the screw ends of the clip B, extend and where such ends are provided with nuts b, for securing the thill-jack C, to the axle A. Upon one side of this plate D, and vertically at right angles to it, is formed one of the sides E, of the thill-jack C. At right angles to the side E, and extending inward to the center of the thill-jack, is formed a lug F, having a flat outer face, and an inner bearing c, in the form of an arc of a circle. The other side G, of the thill-jack C, is made similar to the said side E, except instead of the lug, the side G, is extended to form the arm H. At the end of this arm H, and projecting at right angles from it is the pivot I.

The thill L, has its outer end curved in the usual manner, while its other end is cut away to form the shoulder e, leaving a reduced portion f, and through this reduced portion f, adjacent to the shoulder e, is made a pivot hole g, to fit the said pivot I. At the end of the said reduced portion and extending inward at right angles from it is an arc shaped lug M, its concave side bearing upon the bearing c, of the lug F, while the convex side of the lug M, is engaged by the plate spring N. It will be observed that the arc shaped lugs are arranged to fully overlap each other so that no horizontal or side movement of them is permitted, and that the pivot is of such length to prevent the thill from slipping off of it, while in use.

In order to uncouple the thill from the thill-jack, the thill has to be raised to a vertical position, and simply moved from its off pivot.

Having thus described my invention, what I claim as new, and desire to secure by Letters Patent, is—

In a thill coupling, the combination of the thill-jack, the perforated extension plate D, the lug projecting inwardly from one side of the thill-jack, and having an arc shaped bearing surface, and a straight flat face flush with the end of the said side, the arm projecting from the other side of the thill-jack having a convex bearing end, the pivot formed integral with the arm and flush with the said convex bearing end, the thill having a reduced portion in which is formed the pivot hole, and having a concave bearing shoulder flush with the wall of said hole, and engaged by the bearing end of the thill-jack arm, the arc shaped lug projecting above the thill and over-lapping the lug of the thill-jack, and the plate spring secured under the said extension plate and having a portion extending vertically between the said plate and the thill lug, as set forth.

In witness whereof I hereunto set my hand in the presence of two witnesses.

WILLIAM J. POWERS. [L. S.]

Witnesses:
HENRY A. BURT, Jr.,
JENNIE M. CARPENTER.